(12) United States Patent
Lowes et al.

(10) Patent No.: US 7,575,112 B2
(45) Date of Patent: Aug. 18, 2009

(54) BAGGAGE SCREENING SYSTEM

(76) Inventors: Peter Lowes, 41 Waldorf Heights, Hawley Hill, Blackwater, Hampshire GU17 9JH (GB); Beverley Bowles, 41 Waldorf Heights, Hawley Hill, Blackwater, Hampshire GU17 9JH (GB)

(*) Notice: Subject to any disclaimer, the term of this patent is extended or adjusted under 35 U.S.C. 154(b) by 195 days.

(21) Appl. No.: 10/571,616

(22) PCT Filed: Sep. 10, 2004

(86) PCT No.: PCT/GB2004/003823

§ 371 (c)(1), (2), (4) Date: Mar. 23, 2007

(87) PCT Pub. No.: WO2005/023651

PCT Pub. Date: Mar. 17, 2005

(65) Prior Publication Data

US 2007/0230656 A1    Oct. 4, 2007

(30) Foreign Application Priority Data

Sep. 10, 2004    (GB) .................................... 0321090

(51) Int. Cl.
*B65G 43/08* (2006.01)
(52) U.S. Cl. .................... 198/358; 198/349; 198/350
(58) Field of Classification Search ................. 198/358, 198/349, 349.4, 349.5, 349.6, 350
See application file for complete search history.

(56) References Cited

U.S. PATENT DOCUMENTS

| 5,842,555 | A | * | 12/1998 | Gannon et al. ............... 198/358 |
| 6,058,159 | A | * | 5/2000 | Conway et al. ........... 198/502.1 |
| 6,466,828 | B1 | * | 10/2002 | Lem et al. ................. 198/349.6 |
| 7,021,449 | B2 | * | 4/2006 | Koini et al. .................. 198/358 |
| 7,066,315 | B2 | * | 6/2006 | Tanaka ........................ 198/349 |
| 7,270,226 | B2 | * | 9/2007 | Ostrom ....................... 198/358 |
| 2002/0176532 | A1 | | 11/2002 | McClelland et al. |
| 2003/0082635 | A1 | * | 5/2003 | Terry et al. .................... 702/19 |
| 2004/0251111 | A1 | * | 12/2004 | LeCroy ....................... 198/395 |

FOREIGN PATENT DOCUMENTS

| EP | 1 298 055 | | 4/2003 |
| FR | 2 804 404 | A | 8/2001 |
| JP | 2001 233440 | A | 8/2001 |
| JP | 2002 362730 | A | 12/2002 |

OTHER PUBLICATIONS

International Search Report (Dec. 8, 2004).

* cited by examiner

*Primary Examiner*—James R Bidwell
(74) *Attorney, Agent, or Firm*—Blank Rome LLP

(57) ABSTRACT

A system for screening items of baggage comprises attaching to each baggage item at a check-in location within a terminal an electronic tag which is periodically scanned as the item travels via baggage sortation system from the check-in location and a loading location. All baggage items are diverted from the sortation system to an explosive detection screening system housed within a prefabricated building alongside the terminal. Baggage items which are not cleared by the explosive detection screening system are retained within the building for further inspection and cleared baggage items are reintroduced into the sortation system for travel to the loading location.

6 Claims, 4 Drawing Sheets

BAGGAGE SCREENING SYSTEM

This invention relates to a system for screening baggage or cargo to be placed, for example, in an aircraft hold.

To combat increases in terrorist activity, legislation is being introduced globally to require explosive detection screening ("EDS") of all baggage to be transported in the hold of the aircraft. It is increasingly likely that similar requirements will be imposed for travel by sea and rail.

In many countries the logistics of complying with requirements for EDS of all luggage items are considerable. Many airports that currently have automated baggage sortation systems are faced with significant levels of expenditure and disruption to meet these requirements. Other airports not having automated baggage sortation systems are being presented with solutions that involve the installation of expensive automated systems unnecessarily in order to comply.

The present invention sets out to provide a system for screening baggage, which overcomes or at least alleviates many of the problems referred to above.

In one aspect, the invention provides a system for screening items of baggage for transportation by land, sea rail or air, in which baggage items are screened for explosive detection within a prefabricated building.

In another aspect, the invention provides a system for screening items of baggage, the system comprising attaching to each baggage item at a check-in location within a terminal an electronic tag which is periodically scanned as the item travels via a baggage sortation system from the check-in location and a loading location, diverting all baggage items from the sortation system to an explosive detection screening system housed within a prefabricated building alongside the terminal, retaining for further inspection baggage items which are not cleared by the explosive detection screening system and re-introducing cleared baggage items into the sortation system for travel to the loading location.

The invention will now be described, by way of example only, with reference to the accompanying diagrammatic drawings in which.

For ease of explanation, the following embodiments are discussed in the context of aircraft and airports. It is to be understood, however, that the invention also has application for road, rail and sea transportation.

Systems in accordance with the Invention enable screening of all items of baggage to be held within an aircraft hold, i.e. 100% hold baggage screening. Many countries address the threat levels set in the screening process in different ways. Systems in accordance with the invention are designed to be fully adaptable in accommodating these differences. It is also intended that the invention be utilised to accommodate small parcels and mail that may also travel with baggage items in the hold of an aircraft.

Baggage screening systems in accordance with the invention operate in conjunction with a proven baggage tracking system able to track each item of baggage through the screening process and reconcile a passenger with his/her baggage if necessary. Such a tracking system operates to scan a bag tag applied to a baggage item at a check-in desk at various points in its progress through the system to enable operators and authorities to be alerted to the owner of a suspect baggage item. A system in accordance with the invention is integrated into an existing airport baggage handling system in such a way as to ensure that the integrity of the existing handling system is protected and is not compromised in any way by the presence of the system of the invention.

Important components of systems in accordance with the invention include a prefabricated purpose-built building, conveyor systems, specialised IT systems, EDS equipment, central control rooms and customised design.

Figure 1:
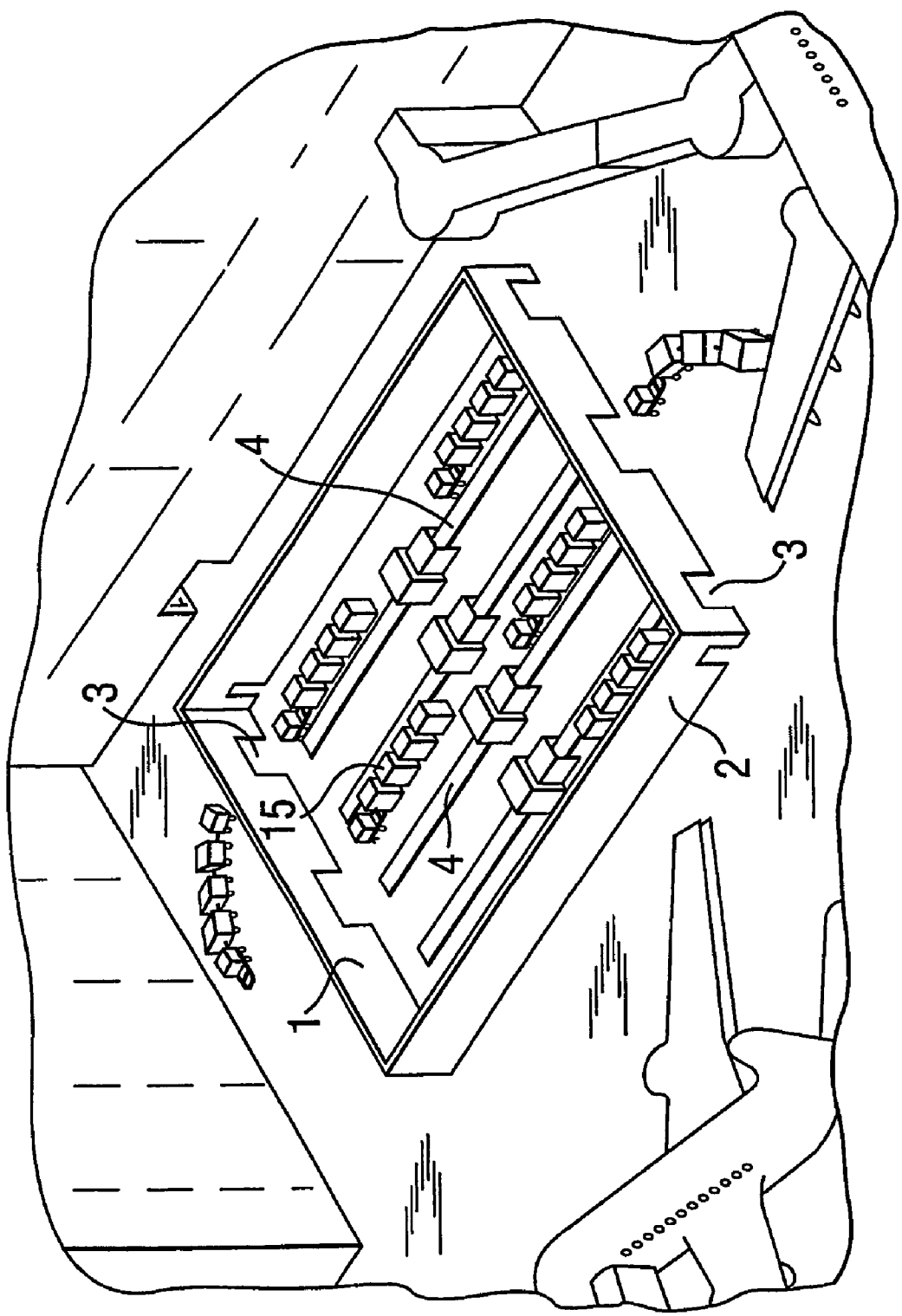
FIG. 1 is a plan view of a system in accordance with the invention utilising a prefabricated building housing manually operated screening equipment.

The building illustrated in FIG. 1 is a conventional prefabricated building 1 which can be erected on site adjacent to a main terminal building of an airport in a relatively short period of time at relatively low cost. The walls, roof and other structural items of the building are prefabricated at a remote location and transported in sections for assembly on site. No footings are required, the building being able to stand alone on an existing base or airport tarmac. The building, when constructed, is designed to withstand heavy winds, rain and snow, and substantial seismic activity. The building specification typically includes HVAC for the EDS units, heat and lighting and a generator with transfer switch. Fire and security systems may be installed if required.

If the building is to house a manual system in accordance with the invention, it is ideally sited between an exit from a baggage hall of an adjacent terminal building and aircraft gate/stands and is connectable to a power supply of the main terminal. Such a building is illustrated in FIG. 1. The illustrated building comprises prefabricated walls 2, covered by a prefabricated roof (not shown). Doors for conveying baggage items to and from the building are shown at 3. Included within the building are four straight line conveyor belts 4 each of which passes through an EDS machine 5. A holding loop 6 is provided after each EDS exit point.

Figure 2:
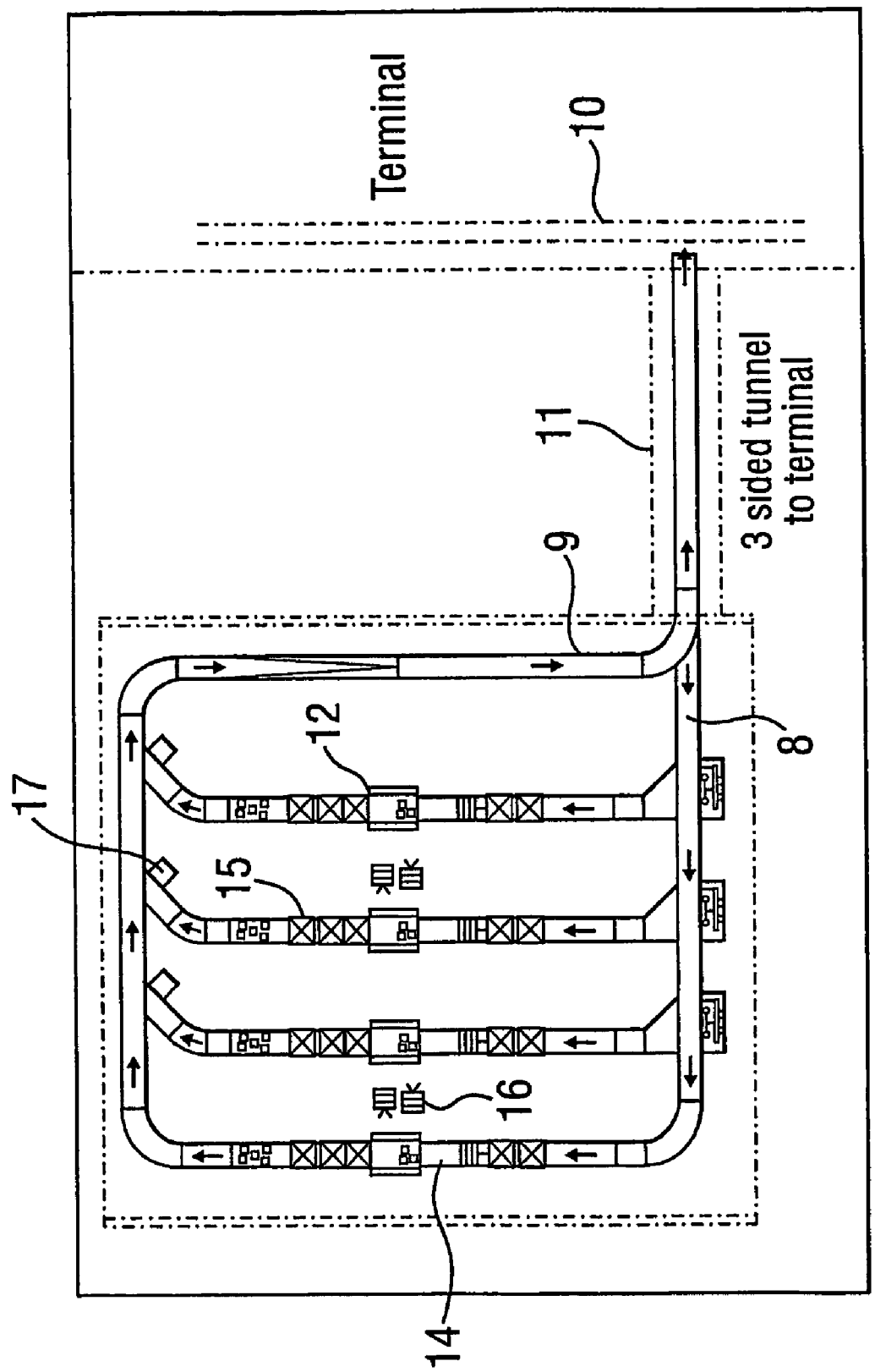
FIG. 2 is a plan view of an alternative system in accordance with the invention utilising a prefabricated building and automated screening equipment.

A building housing an automated screening system in accordance with the invention is illustrated in FIG. 2. Such a building is prefabricated as described above with reference to FIG. 1 and is ideally sited close to a point in the main terminal where an opening can be formed in one wall and a loop installed into the existing baggage sortation system. As shown in FIG. 2, the building houses a conveyor system 8 which is readily adaptable to the requirements of any site and includes a continuous conveyor in the form of a loop 9 which links the system housed within the prefabricated building with the existing airport baggage conveying system 10 shown in broken line. This link is typically positioned between the check-in line and the primary baggage sortation of the existing airport system and the loop 9 is housed within a suitably dimensioned tunnel 11 which houses an endless conveyor for transporting baggage items to and from the loop 9.

Housed within the building are a series of HVAC and EDS units 12 linked by the continuous conveyor system 8 which comprises a main screening lane 14 and three intermediate screening lanes 15. Each screening lane includes an HVAC and EDS unit 12. Operator positions for the screening operation are shown by reference numeral 16.

The screening lanes 14, 15 include holding stations 17 where items of baggage can be detained pending longer inspection and, if necessary, physical search. The conveyor operates at a speed which matches that of the existing airport system conveyors so as not to compromise the required baggage flow. An automated system can either have manned EDS machines (as shown in FIG. 2) or alternatively can be linked to a remote control room from which the EDS machines are controlled and where X-ray images of suspect items of baggage are held and studied by trained operators. In this arrangement, items of baggage under inspection are not able to re-enter the baggage handling system without clearance by a control room operator. These operators also decide whether or not an item of baggage moves to high alert for more extensive X-raying and/or opening in the presence of the respective passenger.

For airports having several terminals or for regional or even national groups of airports, only one control room may be required. Appropriate IT systems allow these remote locations to be controlled from a central point thus restricting on site staff to those necessary to undertake physical inspection of the bags and to reunite bags and passengers where necessary.

Figure 3:
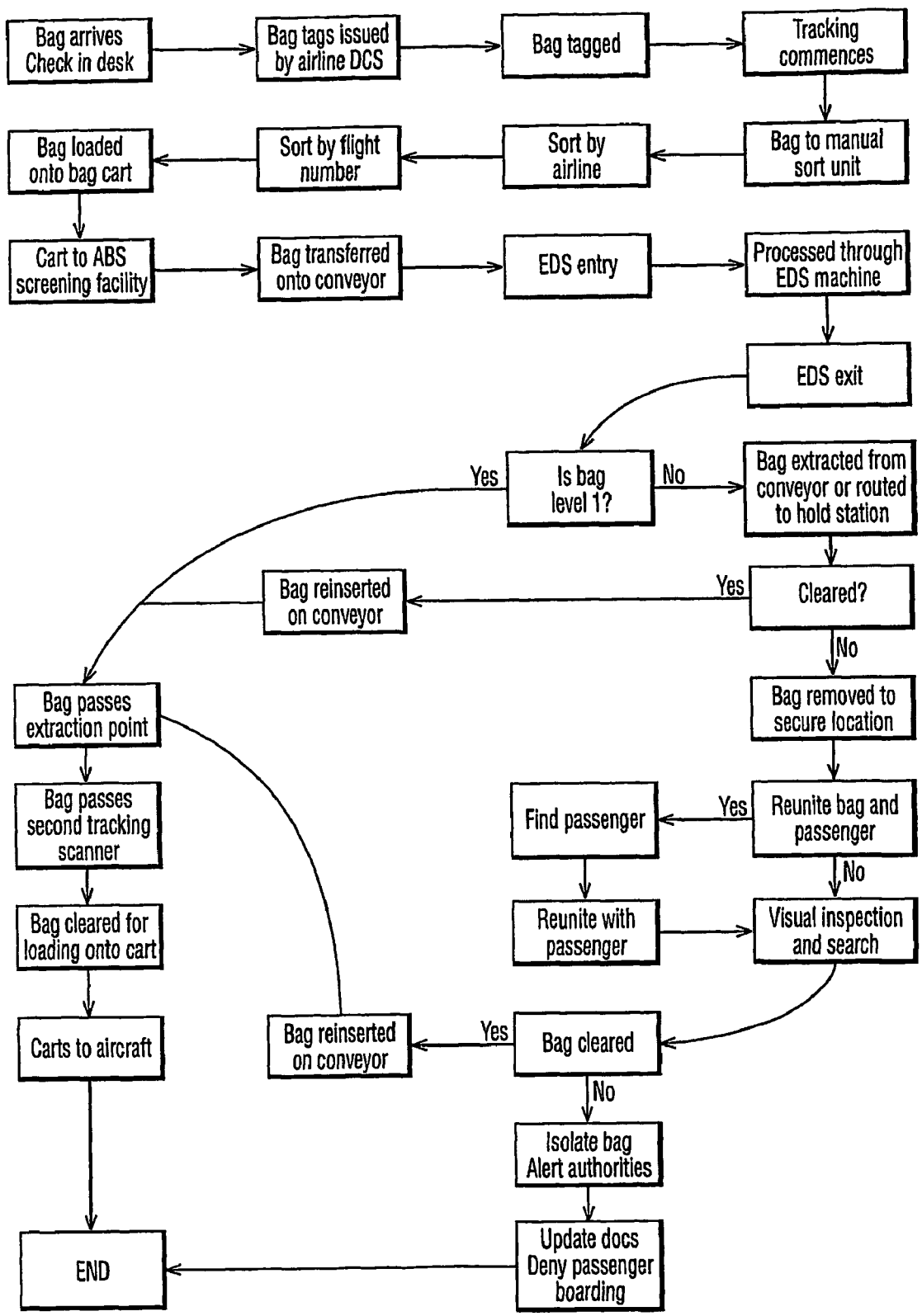
FIG. 3 is a flow chart illustrating a manual screening system in accordance with the invention.

The various process steps of a manual system are illustrated in the flow chart of FIG. 3. As will be seen from this figure, items of baggage are tagged at check-in and sent into the manual sortation unit. The bag tags are issued at check in by the airline DCS and are tracked from that point. The bags are sorted manually by ground handling staff by airline and flight number. The bags are then loaded onto baggage carts which are taken into the prefabricated building for screening. In the building, the ground handling staff transfer the bags from the baggage carts onto the conveyor belts 4 upon which they are processed through the EDS machines 5 with the bag tag being read by bag tracking scanners on entry to the machine and on exit. There are two exit readings. If the bag is passed as level 1, it is scanned on exit from the machine and then passes down the conveyor past an extraction point or siding (conveyor loop). At this point it passes a second exit bag tracking scanner and is then clear to be loaded back onto the baggage carts by the ground handlers and take on to the aircraft.

Trained and approved screeners man the EDS machines in the manual facility. If the screeners decide that the bag is suspect, then the bag exits the machine and passes the first exit bag tracking scanner. At the manual extraction point, the bag is either extracted from the conveyor or routed onto the "hold" conveyor or siding pending more detailed examination of the X-ray image by a supervisor. If the bag is then cleared, it is re-inserted onto the conveyor at the extraction point, passes through the second exit scanner, is loaded onto the baggage carts and taken out to the aircraft.

If at this point the bag is still deemed suspect, it is removed to a secure point in the building to be opened for visual inspection and search. At this point the security personnel will have the option of re-uniting the passenger with the bag. This is achieved by scanning the DCS bag tag that was affixed to the bag at check-in to identify the passenger for location by security personnel. If the passenger has not been required to attend the opening of the bag, and the bag is still deemed suspect or unsafe, then the bag tracking system will enable the security staff to deny boarding to the passenger. If the bag is cleared, then the bag is either taken back to the facility or re-inserted onto the conveyor ahead of the second exit scanner or, if time does not permit, may be taken straight to the aircraft. Should this be the case, the airline staff will be advised and they will manually update the bag track.

Figure 4:
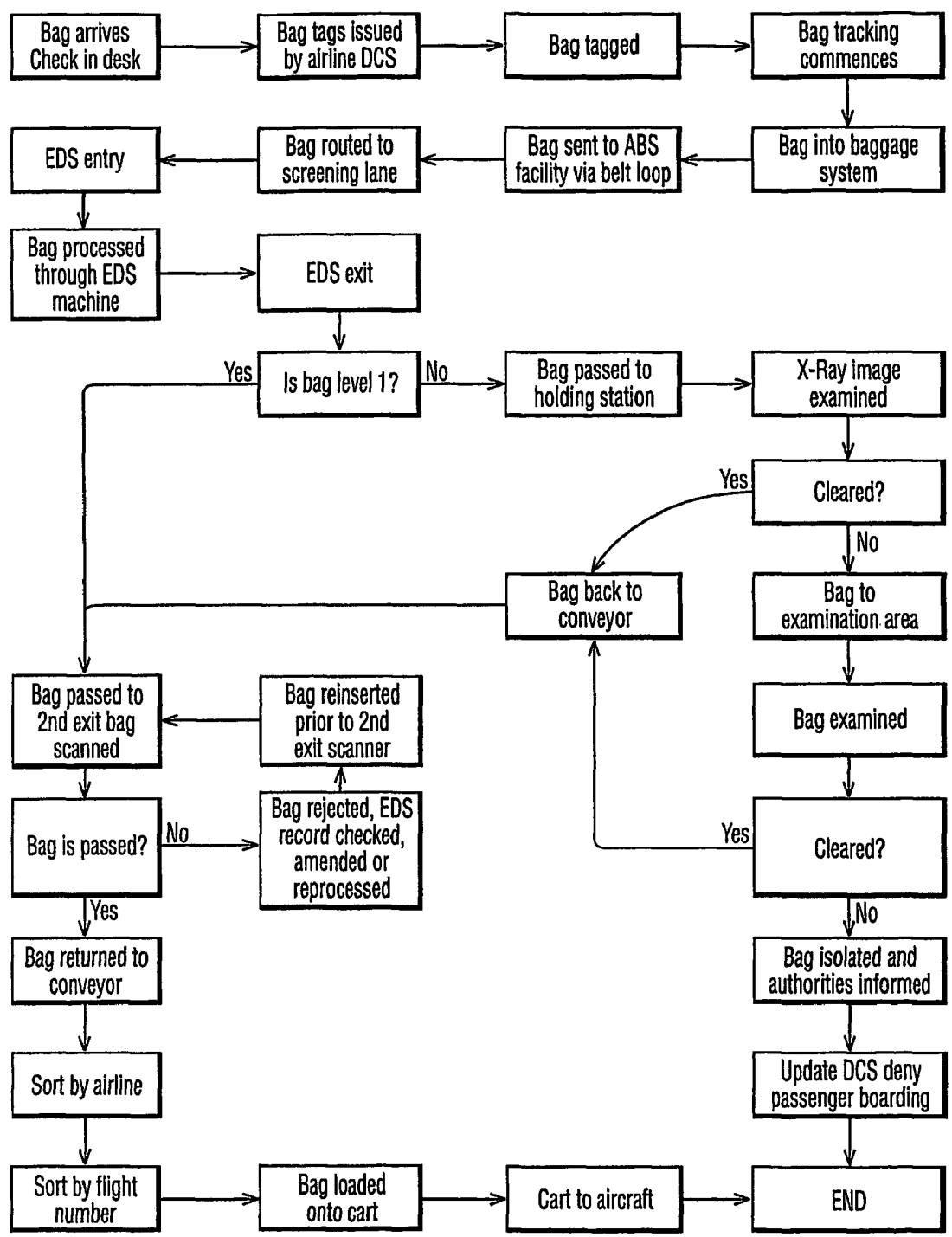
FIG. 4 is a flow chart illustrating an automated screening system in accordance with the invention.

The various steps involved in an automated system in accordance with the invention are shown in the flow chart of FIG. 4. As will be seen from this figure, the screening process is fully automated and the conveyor system is more complex. The building and screening units are located at a point in the airport terminal where the loops can be installed ahead of the primary sortation system.

Items of baggage are tagged at the check-in desk and sent into the baggage system by the check-in agent. The bag tags are issued by the airline DCS and are tracked from that point. The bags are routed to the automated screening facility via the conveyor 8.

On entering the screening facility, the bags are routed by the system into one of a number of the screening lanes 14, 15, each of which is equipped with an EDS machine 12. As with the manual solution, the bags may be scanned by the baggage tracking system as they enter the EDS machine. On exit from the machine cleared bags are routed via the loop 11 back into the terminal baggage system where they progress into the primary sortation system and hence on to their respective flights, as is currently the case.

The EDS machines are fully automated and are set up to have a basic level of tolerance, which is the base inspection level. This level of screening will be adequate for the majority of bags, which will pass through the machines and on into the airport sortation system. In the event that a bag cannot be cleared at this level it is ejected from the machine onto one of the holding conveyors 17. That conveyor will have the capacity to hold a number of uncleared bags whilst the operators in the control room further evaluate the X-ray images of the bags. Bags that are then cleared by the operator will be routed back into the cleared flow by the operator. From that conveyor there is another loop that leads bags which remain uncleared into a separate area for more detailed examination and possibly opening for physical inspection. Once bags have been cleared at this point they will be re-inserted into the system.

Cleared bags pass through a final scanning point prior to re-entering the terminal sortation systems. Uncleared bags cannot pass that waypoint until they have been cleared to proceed by the control room operators.

It will be appreciated that the foregoing is merely exemplary of baggage screening systems in accordance with the invention and that modifications can readily be made thereto without departing from the true scope of the invention.

The invention claimed is:

1. A system for screening items of baggage, the system comprising attaching to each baggage item at a check-in location within a terminal an electronic tag which is periodically scanned as the item travels via a baggage sortation system between the check-in location and a loading location, diverting all baggage items from the sortation system to an explosive detection screening system housed within a prefabricated building alongside the terminal, retaining for further inspection baggage items which are not cleared by the explosive detection screening system and re-introducing cleared baggage items into the sortation system for travel to the loading location.

2. A system as claimed in claim 1 wherein the prefabricated building is sited between an exit from a baggage hall of a terminal building and houses endless conveyor belts for transporting baggage items to and from an EDS machine for screening purposes.

3. A system as claimed in claim 1 wherein a plurality of baggage screening conveyor belts are located within the prefabricated housing each connected at one end to receive baggage items from a continuous loop conveyor and at another end to feed baggage items onto the continuous loop conveyor, each one of the plurality of screening conveyor belts having an EDS machine through which baggage items pass.

4. A system as claimed in claim 3 wherein the loop conveyor is linked to a baggage conveying system located within a terminal building through a continuous conveyor located within a tunnel which places the terminal building in communication with the prefabricated building, the tunnel located conveyor transporting baggage from the conveying system located within the terminal building to and from the continuous loop conveyor of the prefabricated building.

5. A system as claimed in claim 3 wherein each screening conveyor includes a holding station where items of baggage can be detained for inspection purposes.

6. A system as claimed in claim 2 wherein each EDS machine is linked to a remote control room from which all EDS machines are controlled and from which X-ray images of baggage items can be inspected.

* * * * *